United States Patent [19]

Allen, Jr.

[11] 4,268,009

[45] May 19, 1981

[54] SOLENOID VALVE

[75] Inventor: Walter Allen, Jr., Prospect, Conn.

[73] Assignee: Peter Paul Electronics, New Britain, Conn.

[21] Appl. No.: 46,024

[22] Filed: Jun. 6, 1979

[51] Int. Cl.³ .............................................. F16K 31/10
[52] U.S. Cl. .................................... 251/138; 251/245
[58] Field of Search ........................ 251/138, 245, 246

[56] References Cited

U.S. PATENT DOCUMENTS 2,570,450 10/1951 Hottenroth .......................... 251/138
3,683,962 8/1972 Good ............................... 251/138 X

FOREIGN PATENT DOCUMENTS 518954 3/1955 Italy ..................................... 251/138

Primary Examiner—Arnold Rosenthal
Attorney, Agent, or Firm—McCormick, Paulding & Huber

[57] ABSTRACT

A solenoid-operated normally open two-way fluid control valve has a lever operably connecting a reciprocally movable solenoid plunger and a reciprocally movable seal pin. When the solenoid is in its deenergized condition the solenoid plunger acts upon the lever to maintain the seal pin in its normal open or unseated position. Energization of the solenoid removes the influence of the plunger upon the lever and permits the seal pin to be spring biased to its closed or seated position. When the solenoid is deenergized the solenoid plunger is spring biased toward the lever and acts through the lever to exert impact force on the seal pin to unseat it.

10 Claims, 4 Drawing Figures

SOLENOID VALVE

BACKGROUND OF THE INVENTION

This invention relates in general to solenoid-operated fluid control valves and deals more particularly with an improved two-way normally open fluid control valve particularly adapted for high pressure operation. In a high pressure fluid control valve of the aforedescribed general type a valve element, which is normally maintained in an open position, moves to closed or seated position in response to actuation of a solenoid. Heretofore, lever operated two-way valves of normally open type have been provided wherein movement of a solenoid plunger in one direction causes movement of a valve element in a generally opposite direction. In such a valve at least a portion of the operating lever is usually exposed externally of the valve chamber which poses problems in sealing the valve, particularly where the valve is subjected to relatively high fluid pressures. In small valves of the aforedescribed general type movement of the valve element between open and closed positions is relatively slight. Fluid flow past the valve element in its open position and through the outlet orifice defined by the valve seat produces a venturi action which tends to suck the valve element toward its closed position and may cause some variation in flow rate. A further problem may be encountered in obtaining desired rapid valve operation and sharp definition of valve operational characteristics. Accordingly, it is the general aim of the present invention to provide an improved normally open fluid control valve of a lever operated type wherein the valve is positively supported in its normally open position, having rapid, positive operating characteristics, and capable of leak-free operation at relatively high operation pressures.

SUMMARY OF THE INVENTION

In accordance with the present invention, an improved two-way normally opened solenoid operated valve has a valve body which defines a valve chamber. A seal pin contained in the valve chamber and guided for reciprocal movement toward and away from a valve seat between open and closed positions controls flow of fluid from an inlet passageway to and through an outlet passageway. The seal pin is normally biased towards closed position and is maintained in a normally open position by a lever supported on a fulcrum and wholly contained within the valve chamber. A solenoid assembly mounted on the valve body has a reciprocally movable plunger which extends into the valve chamber and is engageable with an associated end portion of the lever. When the solenoid is deenergized the plunger is biased toward the lever causing the lever to retain the seal pin in open position. Energization of the solenoid removes the influence of the plunger on the lever and permits a spring associated with the seal pin to urge the pin to its closed position.

DETAILED DESCRIPTION OF PREFERRED EMBODIMENT

Figure 1:
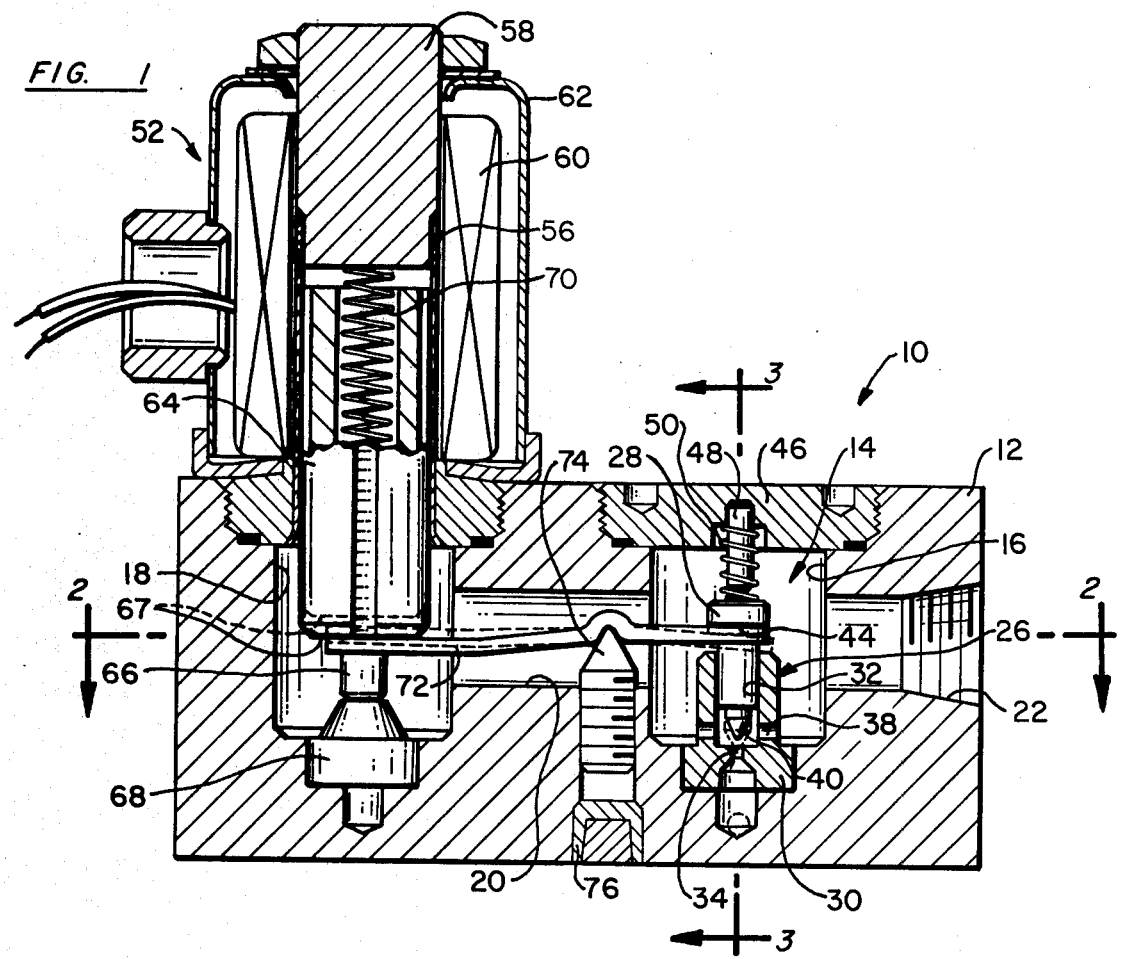
FIG. 1 is a vertical sectional view of a solenoid-operated fluid control valve embodying the present invention.
Figure 2:
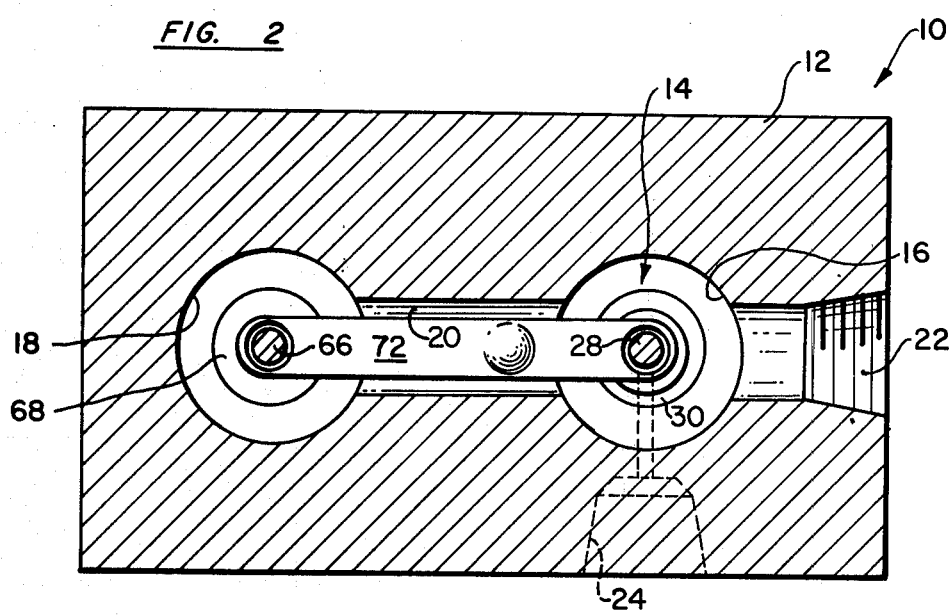
FIG. 2 is a sectional view taken along the line 2—2 of FIG. 1.
Figure 3:
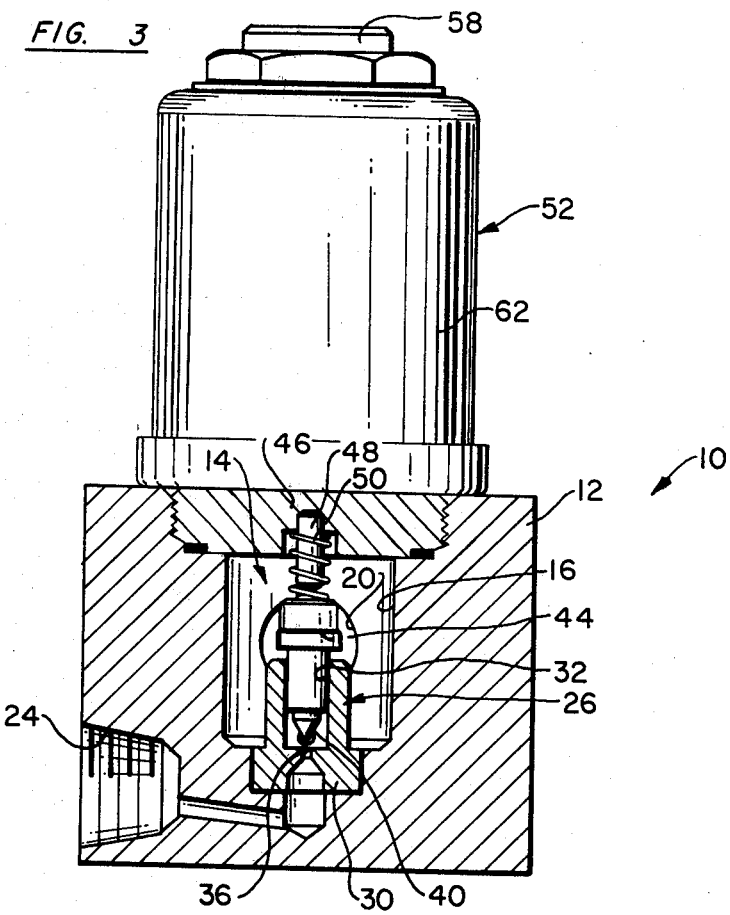
FIG. 3 is a sectional view taken along the line 3—3 of FIG. 1.

Referring now to the drawing, a solenoid-operated fluid control valve embodying the present invention is designated generally by the reference numeral 10. A valve 10 is particularly adapted for high pressure operation and comprises a two-way normally open valve of impact type which has a generally rectangular body designated by the numeral 12. A valve chamber formed in the body, and indicated generally at 14, includes a valve cavity 16, a plunger cavity 18, and a connecting passageway 20 which extends between and communicates with the cavities 16 and 18. The cavities 16 and 18 are generally cylindrical, arranged in axially parallel side-by-side relation, and open through the upper surface of the valve body 12, as the solenoid 10 appears oriented in the drawing. A fluid inlet passage 22, which opens through one end of the body 12, communicates with the valve cavity 16 and is coaxially aligned with the connecting passageway 20. The inlet passage 22 and the connecting passageway 20 are preferably formed by the same drilling or boring operation. An outlet passage 24 is also formed in the body 12 and communicates with the valve cavity 16, as will be hereinafter further discussed. The inlet passage 22 and the outlet passage 24 are threaded to receive conventional conduit fittings for connecting fluid lines to the valve 10.

Figure 4:
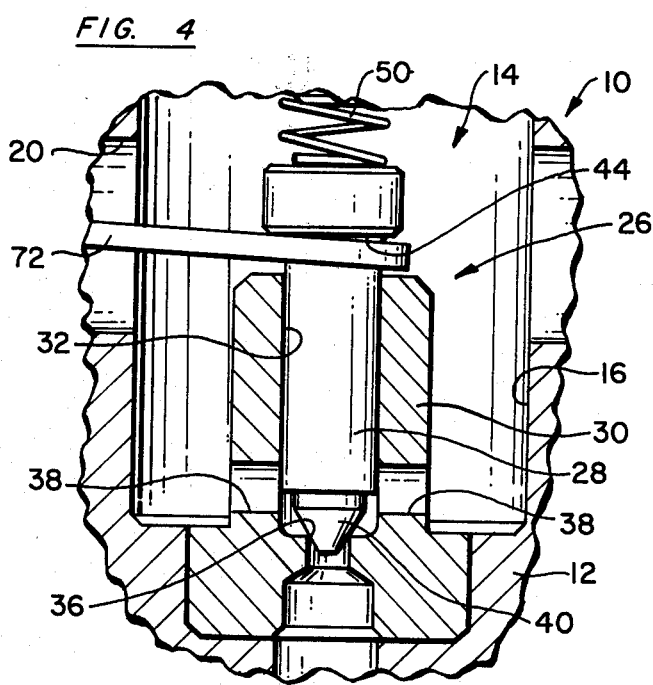
FIG. 4 is a somewhat enlarged fragmentary view of the control valve as it appears in FIG. 1.

A valve assembly received within the valve cavity and indicated generally by the numeral 26 includes a seal pin 28 and a valve insert 30 which provides a valve seat for the seal pin and guides it for reciprocal axial movement within the valve cavity 16. The valve insert 30 is mounted in press-fit relation within a cylindrical recess at the lower end of the valve cavity 16 as best shown in FIG. 4, and includes a cylindrical guide portion which extends upwardly into the valve cavity 16 and has a coaxial guide bore 32 formed therein. The insert 30 also defines an inner end portion of the outlet passage 24 and has an outlet orifice located at the inner end of the outlet passageway and defined by a valve seat 36. Radial passageways 38, 38 extend through the guide portion of the insert and communicate with the guide bore 32 in the region of the bore near the valve seat 36.

The seal pin 28 is preferably made from plastic material such as KEL-F, TEFLON, DELRIN or like material and has an axially elongated shank portion slidably received within the guide bore 32. A conical seating surface 40 formed at the lower end of the seal pin 28 is adapted for sealing engagement with the valve seat 36 when the seal pin is in its closed position, as it appears in FIG. 4. The seal pin 28 is formed with an enlarged head at its upper end which defines a downwardly facing annular abutment surface 44. The length of the shank portion is such that the abutment surface 44 is spaced some distance above the upper end of the guide portion when the seal pin is in its seated or closed position.

The upper end of the valve cavity 16 is closed by a cover plate 46 threadably engaged within a diametrically enlarged upper end portion of the cavity 16. A spring guide 48 projects downwardly from the cover plate 46 in coaxial alignment with the seal pin 28 and has an abutment surface at its lower end for limiting upward travel of the seal pin. A compression spring 50 surrounds the spring guide 48 and acts between the cover plate and the enlarged head of the seal pin 28 to normally bias the seal pin toward its closed or sealing position of FIG. 4. In accordance with presently preferred construction, the spring 50 has a 12 ounce maximum compression loading, that is the spring 50 exerts a downwardly directed 12 ounce biasing force on the seal pin 28 when the head of the seal pin is engaged with the abutment surface on the lower end of the spring retainer or guide 48 and the spring attains its maximum compression.

A solenoid assembly indicated generally at 52 is mounted at the upper end of the plunger cavity 18 and includes an annular nut 54 which is threaded into a diametrically enlarged upper end portion of the cavity 18 and which provides a closure for the cavity. An axially elongated plunger guide sleeve 56 centrally secured in the annular nut 54 extends upwardly therefrom. The sleeve is made from a substantially non-magnetic material and is closed at its upper end by a plug 58 welded or otherwise secured therein. The solenoid assembly 52 further includes a solenoid or magnet coil 60, which surrounds the sleeve 56, and a housing 62 which cooperates with the annular nut to provide an enclosure for the solenoid coil and which is retained in assembly with the valve body 12 by a retaining nut threadably engaged with the upper end of the plug 58. The solenoid assembly 52 also has an armature or impact plunger 64 of generally cylindrical form made from magnetic material. The plunger 64 is received within the sleeve 56 for axial sliding movement therein and has a blind upwardly opening bore. The plunger 64 also has a coaxial projection 66 of reduced diameter at its lower end and a downwardly facing annular abutment surface 67. A dummy insert 68 mounted in press fit engagement within a recess in the valve body 12 at the lower end of the plunger cavity 18 has an upwardly facing abutment surface thereon coaxially aligned with the projection 66. The abutment surface limits the downward travel of the plunger 64 which is normally biased in a downward direction and away from the solenoid coil by a compression spring 70 received within the plunger bore and acting between the plunger 64 and the plug 58 substantially as shown in FIG. 1. In accordance with presently preferred construction, the spring 70 has a 28 ounce maximum compressive loading, that is the spring 70 exerts a downwardly directed 28 ounce biasing force upon the plunger 64 when the upper end of the plunger is engaged with the lower end of the plug 58 and the spring attains its maximum compression.

Operating connection between the plunger 64 and the seal pin 28 is provided by a lever 72 which extends through the connecting passageway 20. The lever 72 is supported intermediate its ends within the valve chamber 14 by a fulcrum 74 and has holes near its opposite ends. The seal pin is loosely received within an associated hole near one end of the lever 72 whereas the plunger projection 66 extends into the hole at the opposite end of the lever. In accordance with presently preferred construction, the moment arm between the plunger 64 and the fulcrum 74 is approximately twice as long as the moment arm between the fulcrum and the seal pin 28. Preferably, and as shown, the fulcrum 74 comprises a cone pointed screw 74 threaded upwardly into the valve body 12 to project into the connecting passageway 20 and further secured to the body 12 by an anaerobic adhesive and sealing compound, such as LOCTITE, marketed by Loctite Corporation, Newington, Conn. An associated portion of the lever 72 is formed to receive the cone pointed end of the screw 74 to provide positive fulcrum action. A fulcrum screw 74 facilitates adjustment of fulcrum position during valve assembly, for a purpose which will be hereinafter evident. After the position of the fulcrum has been adjusted an expansion plug 76 is inserted into and expanded within the opening in the valve body 12 below the head of the fulcrum screw 74. The expansion plug 76 provides a further positive seal to prevent fluid leakage from the valve body in the event that leakage occurs at the threaded connection between the screw 74 and the body 12. The plug 76 also prevents tampering which might result in a change in the adjustment of the fulcrum screw 74.

When the solenoid coil 60 is in its normally deenergized condition the plunger 64 is held in its solid line position of FIG. 1 by the downwardly directed biasing force of the spring 70. The projection 66 abuts the dummy seat 68 and the abutment surface 67 bears upon its associated end of the lever 72 causing the lever to exert an upwardly directed force upon the annular abutment surface 44 on the seal pin. The downwardly directed force exerted upon the plunger by the spring 70 is substantially greater than the downwardly directed force exerted upon the seal pin by the lighter spring 50. Further, since the plunger 64 is located at a substantially greater distance from the lever fulcrum than the seal pin 28 the plunger 64 exerts an overbalancing force upon the lever 72 in counterclockwise direction, as viewed in FIG. 1. This overbalancing force maintains the seal pin in its unseated position in opposition to the downwardly directed biasing force exerted on the seal pin by the spring 50. Thus, when the solenoid coil is in its deenergized condition the plunger 64 cooperates with the lever 72 to positively maintain the seal pin 28 in its raised or normally open position wherein the conical seating surface 40 is disposed a substantial distance above the valve seat 36 for flow clearance. Pressure fluid may flow freely into and through the inlet passage 22 to the valve chamber 14 and outwardly through the radial passages 38, 38, through the outlet orifice defined by the valve seat 36 and through the outlet passage 24 without exerting undue influence upon the sealing pin.

Energization of the solenoid coil 60 causes the plunger 64 to move upwardly in opposition to the biasing force of the plunger spring 70. As the plunger rises, influence of the lever 72 upon the seal pin 28 decreases allowing the seal pin spring 50 to bias the seal pin toward its seated position. As the seal pin approaches its closed position venturi action produced by fluid flow through the outlet orifice defined by the valve seat 36 tends to suck the seal pin toward its seated position. Thus, a relatively light spring may be used to bias the seal pin toward its closed position. When the seal pin attains its closed position pressure differential across the valve seat 36 will be sufficiently great to maintain the seal pin in tightly sealed engagement with the valve seat. The downward force exerted upon the lever 72 by the seal pin as it moves to its seated position causes the lever to pivot in clockwise direction, as shown in FIG. 1. Clockwise pivotal movement of the lever 72 is limited by engagement of an associated end of the lever with the upper surface of the insert 30. However, the plunger 64 may continue to travel upwardly relative to the opposite end of the lever after the lever ceases to pivot in clockwise direction. Thus, when the plunger 64 completes its upward travel there will be clearance between either or both the abutment surface 67 and its respectively associated end of the lever and the abutment surface 44 and the end of the lever associated therewith. Since the seal pin guide bore 32 and the valve seat 36 are formed by a unitary insert accurate concentricity between the cylindrical guide surface and the valve seat is assured so that an efficient seal is maintained.

When the solenoid coil 16 is deenergized the spring 70 biases it downwardly toward the lever 72. During the initial portion of its travel to its deenergized position the plunger 64 moves relative to the lever 72 or with the lever and relative to the seal pin 28, due to the clearance between the abutment surfaces 67 and 44 and the respectively associated end portions of the lever 72. This clearance arrangement allows the solenoid plunger, acting through the lever, to exert impact force upon the seal pin 28 to unseat it. During the final portion of plunger travel from its energized to its deenergized position, the lever 72 pivots in counterclockwise direction to its solid line position of FIG. 1 wherein it is normally maintained by the solenoid plunger when the solenoid coil 60 is deenergized.

In accordance with presently preferred practice, the fulcrum screw is adjusted after the plunger cavity has been closed by the annular nut 54 and before the cover plate 46 is threaded into the upper end portion of the valve cavity 16. The fulcrum screw is threaded into the valve body but not far enough to unseat the seal pin 28 from the valve seat 36. A suitable dial indicator gauge is positioned within the open end of the seal pin. Thereafter, the fulcrum screw is adjustably threaded into the valve body to cause the end of the lever 72 associated with the seal pin to engage the annular surface 44 and to raise the seal pin to a desired level above the seating surface, as indicated by the gauge, whereby to provide desired flow clearance. Thereafter, the dial gauge is removed and the cover plate 46, the spring guide 48, and the seal pin spring 50 are assembled within the valve body. The expansion plug 76 is then inserted into and expanded within the valve body to retain desired flow clearance adjustment.

I claim:

1. A solenoid-operated fluid control valve comprising a valve body defining a valve chamber, fluid inlet and outlet passages each respectively communicating between the exterior of said valve body and said chamber, means defining a valve seat in said valve chamber and an outlet orifice opening through said valve seat at the inner end of said outlet passage, an axially elongated seal pin having a seating surface thereon, guide means supporting said seal pin for reciprocal movement toward and away from said valve seat between closed and open positions, said seating surface in said closed position sealingly engaging said valve seat to prevent fluid flow from said valve chamber through said outlet orifice and said outlet passage, means for biasing said seal pin toward its closed position, a lever wholly disposed within said valve chamber and engageable with said seal pin, a fulcrum screw threadably engaged in said valve body and extending into said valve chamber and supporting said lever for pivotal movement within said valve chamber, a solenoid assembly mounted on said valve body and including a solenoid plunger supported for reciprocal movement toward and away from said lever between first and second positions, respectively, means for biasing said plunger to its first position wherein said plunger bears against said lever and said lever engages said seal pin and maintains said seal pin in its open position, and magnetic means for moving said solenoid from its first to its second position and for maintaining said plunger in its second position, said seal pin being biased to and retained in its closed position by said seal pin biasing means when said plunger is in its second position.

2. A solenoid-operated fluid control valve as set forth in claim 1 wherein said seal pin is engageable with one end of said lever, said plunger is engageable with the opposite end of said lever, and said fulcrum engages said lever intermediate its ends.

3. A solenoid-operated fluid control valve as set forth in either claim 1 or claim 2 wherein said chamber includes a valve cavity containing said seal pin, a plunger cavity receiving said solenoid plunger, and a connecting passageway opening into and extending between said valve cavity and said plunger cavity, and said lever extends through said connecting passageway.

4. A solenoid-operated fluid control valve as set forth in either claim 1 or claim 2 wherein said lever has holes therein spaced from said fulcrum and said seal pin extends through one of said holes and said solenoid plunger has a projection thereon extending into another of said holes.

5. A solenoid-operated control valve as set forth in either claim 1 or claim 2 wherein the moment arm of said lever between said fulcrum and said solenoid plunger substantially greater than the moment arm of said lever between said fulcrum and said seal pin.

6. A solenoid-operated control valve as set forth in either claim 1 or claim 2 wherein said seal pin biasing means comprises a compression spring acting between said valve body and said seal pin and said control valve includes a spring retainer maintaining said compression spring in position within said valve cavity and engageable with said seal pin for limiting movement of said seal pin away from said valve seat.

7. A solenoid-operated control valve as set forth in claim 1 wherein said screw is adjustable relative to said valve body to adjust clearance between said seating surface and said valve seat when said seal pin is in its open position.

8. A solenoid-operated control valve as set forth in claim 7 wherein said screw is further characterized as a cone pointed screw.

9. A solenoid-operated fluid control valve as set forth in claim 1 wherein said valve is further characterized as an impact valve and said lever provides lost motion connection between said plunger and said seal pin when said plunger is in its second position.

10. A solenoid-operated two-way normally open fluid control impact valve comprising a valve body having a generally cylindrical plunger cavity and a generally cylindrical valve cavity arranged in axially parallel side-by-side relation and a connecting passageway opening into and extending between said plunger cavity and said valve cavity and defining a valve chamber, fluid inlet and outlet passages each resepectively communicating between the exterior of said valve body and said chamber, means defining a valve seat in said valve cavity and an outlet orifice opening through said valve seat at the inner end of said outlet passage, an axially elongated seal pin having a seating surface thereon, guide means supporting said seal pin for reciprocal axial movement within said valve cavity toward and away from said valve seat between closed and open positions, said seating surface in said closed position sealingly engaging said valve seat to prevent fluid flow from said valve chamber through said outlet orifice and said outlet passage, means for biasing said seal pin toward its closed position, a lever wholly disposed within said valve chamber and extending through said connecting passageway and engageable with said seal pin, a fulcrum screw threadably engaged in said valve body and disposed within said valve chamber and supporting said lever within said connecting passageway for pivotal movement within said valve chamber, a solenoid assembly including a solenoid plunger supported within said plunger cavity for reciprocal axial movement toward and away from said lever between first and second positions, respectively, means for biasing said plunger to its first position wherein said plunger bears against said lever and said lever engages said seal pin and maintains said seal pin in its open position, and magnetic means mounted on said valve body for moving said solenoid plunger from its first to its second position and for maintaining said plunger in its second position, said seal being biased to and retained in its closed position by said seal pin biasing means when said plunger is in its second position.

* * * * *